(12) United States Patent
Nguyen et al.

(10) Patent No.: US 8,875,786 B2
(45) Date of Patent: Nov. 4, 2014

(54) METHODS AND COMPOSITIONS FOR SAND CONTROL IN INJECTION WELLS

(75) Inventors: Philip D. Nguyen, Duncan, OK (US); Ronald G Dusterhoft, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 461 days.

(21) Appl. No.: 12/730,450

(22) Filed: Mar. 24, 2010

(65) Prior Publication Data
US 2011/0232906 A1    Sep. 29, 2011

(51) Int. Cl.
*C09K 8/56*    (2006.01)
*E21B 43/02*    (2006.01)
*E21B 43/16*    (2006.01)

(52) U.S. Cl.
CPC .. *C09K 8/56* (2013.01); *E21B 43/16* (2013.01)
USPC .......................... 166/278; 166/279; 166/305.1

(58) Field of Classification Search
USPC ....................... 166/305.1, 278, 279
See application file for complete search history.

(56) References Cited

U.S. PATENT DOCUMENTS

| | | | | |
|---|---|---|---|---|
| 2,986,538 | A * | 5/1961 | Nesbitt et al. ................. | 507/104 |
| 3,114,419 | A | 12/1963 | Perry et al. | |
| 3,384,173 | A * | 5/1968 | Nahin et al. .................. | 166/295 |
| 3,644,266 | A | 2/1972 | Harnsberger | |
| 4,232,740 | A * | 11/1980 | Park .............................. | 166/276 |
| 4,589,490 | A | 5/1986 | Darr et al. | |
| 5,249,627 | A | 10/1993 | Harms | |
| 5,775,425 | A | 7/1998 | Weaver et al. | |
| 5,833,000 | A | 11/1998 | Weaver | |
| 5,853,048 | A | 12/1998 | Weaver | |
| 6,176,315 | B1 | 1/2001 | Reddy | |
| 6,258,755 | B1 | 7/2001 | House | |
| 6,291,404 | B2 | 9/2001 | House | |
| 6,607,035 | B1 | 8/2003 | Reddy | |
| 6,764,981 | B1 | 7/2004 | Eoff | |
| 6,843,841 | B2 | 1/2005 | Reddy | |
| 7,131,491 | B2 | 11/2006 | Blauch | |
| 7,350,579 | B2 | 4/2008 | Gatlin | |
| 7,448,451 | B2 * | 11/2008 | Nguyen et al. ................ | 166/295 |
| 7,493,957 | B2 * | 2/2009 | Nguyen et al. ................ | 166/295 |
| 7,730,950 | B2 * | 6/2010 | Nguyen et al. ............ | 166/305.1 |
| 2005/0061509 | A1 * | 3/2005 | Nguyen ........................ | 166/307 |
| 2005/0277554 | A1 | 12/2005 | Blauch | |
| 2006/0219408 | A1 * | 10/2006 | Nguyen et al. ................ | 166/295 |
| 2007/0007010 | A1 * | 1/2007 | Welton et al. ............... | 166/280.2 |
| 2007/0187097 | A1 * | 8/2007 | Weaver et al. .............. | 166/280.2 |
| 2007/0289781 | A1 * | 12/2007 | Rickman et al. ................. | 175/65 |
| 2008/0011478 | A1 * | 1/2008 | Welton et al. .............. | 166/280.2 |
| 2008/0110624 | A1 | 5/2008 | Nguyen et al. | |
| 2009/0120639 | A1 | 5/2009 | Nguyen et al. | |
| 2009/0173490 | A1 | 7/2009 | Dusterhoft | |
| 2009/0173497 | A1 | 7/2009 | Dusterhoft | |
| 2009/0203553 | A1 | 8/2009 | Gatlin | |
| 2009/0275488 | A1 | 11/2009 | Zamora | |
| 2010/0186954 | A1 * | 7/2010 | Nguyen et al. ................. | 166/279 |
| 2010/0270023 | A1 * | 10/2010 | Dusterhoft et al. ......... | 166/308.6 |
| 2011/0030950 | A1 | 2/2011 | Weaver et al. | |
| 2011/0232906 | A1 | 9/2011 | Nguyen et al. | |
| 2012/0043082 | A1 | 2/2012 | Nguyen et al. | |

FOREIGN PATENT DOCUMENTS

| | | | |
|---|---|---|---|
| CA | 2552421 | A1 | 6/2007 |
| CA | 2684966 | A1 | 11/2008 |
| EP | 2067836 | A1 | 6/2009 |
| FR | 2918385 | | 12/2009 |
| FR | 2932183 | A1 | 12/2009 |
| WO | WO2009/079231 | | 6/2009 |
| WO | WO2009/106987 | | 9/2009 |
| WO | 2013062750 | A1 | 5/2013 |

OTHER PUBLICATIONS

International Search Report and Written Opinion for PCT/GB2011/000413 dated Jun. 28, 2011.
International Search Report and Written Opinion for PCT/US2012/059316 dated Jan. 7, 2013.
Official Action for Canadian Patent Application No. 2,791,420 dated Sep. 12, 2013.

* cited by examiner

*Primary Examiner* — Catherine Loikith
(74) *Attorney, Agent, or Firm* — McDermott Will & Emery LLP; Holly Soehnge

(57) ABSTRACT

Methods of preventing or reducing migration of particulates in injection wells. Some embodiments of the present invention describe methods of introducing a tackifying treatment fluid through an injection well and into a portion of a subterranean formation surrounding the injection well, wherein the tackifying treatment fluid comprises a base fluid and a tackifying agent. Other embodiments include a step of introducing a resin treatment fluid to the injection well before the tackifying treatment fluid.

20 Claims, No Drawings

METHODS AND COMPOSITIONS FOR SAND CONTROL IN INJECTION WELLS

BACKGROUND

The present invention relates to fluids useful for treating injection wells to prevent or to reduce migration of particulates therein.

Generally, in the recovery of hydrocarbons, such as oil, from a subterranean formation, the energy required to force the hydrocarbons into producing wells may be supplied by the natural pressure drive existing in the formation or by mechanically lifting hydrocarbons from the subterranean formation through the wells bores of producing wells to the surface. However, at the end of primary recovery operations, the natural driving pressure may be below a pressure sufficient for production while still leaving a substantial quantity of hydrocarbons in the subterranean formation. In such cases, secondary recovery methods, such as injection operations, may be used to retrieve the remaining hydrocarbons. For example, in typical injection operations the energy for producing the remaining hydrocarbons from the subterranean formation may be supplied by the injection of fluids into the formation under pressure through one or more injection wells penetrating the reservoir. The injection fluids then drive the hydrocarbons toward one or more producing wells that are in the reservoir. Typical injection fluids include water, steam, carbon dioxide, and natural gas.

The sweep efficiency of injection operations, however, may vary greatly depending on a number of factors, such as variability in the permeability of the formation. As used herein the term "sweep efficiency" refers to the measure of the effectiveness of an injection operation wherein the operation depends on the volume of the reservoir contacted by the injected fluid. That is, sweep efficiency measures the percentage of the hydrocarbons displaced from the reservoir by the injection fluid. In particular, where the subterranean formation contains high permeability zones, the injection fluids may flow through the areas of least resistance, e.g., through the high permeability zones, thereby bypassing less permeable zones. While injection operations may provide the energy necessary to produce hydrocarbons from the high permeability zones, hydrocarbons contained within less permeable zones may not be driven to the one or more production wells penetrating the formation.

However, injection wells experience problems of varying degrees of severity when formation solids migrate or are weakened due to the injection process. These problems are more likely and may be more acute in injection wells that penetrate weak or unconsolidated formations, and/or injection wells that are subject to frequent shut down and start up cycles.

For example, the injection of fluids into a reservoir tends to weaken the near well bore region surrounding the injection well. The injection fluids may reduce the cohesive strength of the rock surrounding the well bore. This effect may be especially severe when the injection fluid is introduced to the injection well at pressures that exceed the fracture pressure of the formation around the injection well bore. This weakening may be particularly severe when a formation is subjected to rapid shut down cycles, such cycles may cause a water hammer effect that creates localized stresses and leads to reduced consolidation. Injection wells that receive a particularly large amount of injection fluid, for example over 30,000 barrels of injection fluid per day are particularly susceptible to loss of consolidation of formation particulates.

In addition, non-uniform injection rates can cause differential pressure to build between reservoir layers. This differential pressure becomes particularly problematic if the well is ever shut in for any reason. Upon shut in, the pressure between the layers attempts to equalize, which causes crossflow between the layers and may result in the influx of formation particulates into the well bore (causing unwanted solids production) or into the interstitial spaces within the formation (decreasing permeability). This effect may be particularly pronounced in areas of the formation that have already been weakened by the injection fluid.

Another possible failure mechanism for an injection well is that rapid shut down cycles for an injection well can result in water hammer effects that create high localized stress in the immediate well bore region. These local stresses can result in mechanical failure and production of formation solids. Further, in weak formations, injecting water into the formation can desegregate the rock in the near well bore region and increase the pressure around the well bore, weakening grain-to-grain bonds, and, in some cases forming a completely unconsolidated mass.

While conventional cased and perforated wells have been used for water injection wells, but have been highly prone to failure. Screen only, including expandable screen, completions open hole gravel pack, cased hole gravel pack and frac and pack completions have been used with varying degrees of success, but failure rates are unacceptable.

Moreover, in some cases there have been channeling problems whereby fluid from the injection wells follows either high permeability sections or channels along bedding plains to the production wells. In these cases, even a small amount of sand produced at the injection well or the production well can result in a fully connected channel forming between the injection well and the production well. This creates an undesirable situation wherein the injected fluid, rather than propelling hydrocarbons for production, is simply produced out of the producing well. Stabilization of the formation particles in these high permeability sections will help stop the movement and erosion of sand into the production well and help minimize the creation of these high capacity channels.

SUMMARY

The present invention relates to fluids useful for treating injection wells to prevent or to reduce migration of particulates therein.

Other embodiments of the present invention provide methods comprising providing an injection well; introducing a tackifying treatment fluid through the injection well and into a portion of a subterranean formation surrounding the injection well, wherein the tackifying treatment fluid comprises a base fluid and a tackifying agent.

Some embodiments of the present invention provide methods comprising providing an injection well; introducing a resin treatment fluid through the injection well into a portion of a subterranean formation surrounding the injection well wherein the resin treatment fluid comprises a first base fluid and a resin; allowing the resin to at least partially cure within the formation; and, introducing a tackifying treatment fluid to the injection well, wherein the tackifying treatment fluid comprises a second base fluid and a tackifying agent.

The features and advantages of the present invention will be readily apparent to those skilled in the art. While numerous changes may be made by those skilled in the art, such changes are within the spirit of the invention.

DESCRIPTION OF THE PREFERRED EMBODIMENTS

The present invention relates to fluids useful for treating injection wells to prevent or to reduce migration of particulates therein.

As used herein, an "injection well" is a well bore into which fluids are injected rather than produced. Injection wells are generally designed as accept an injection fluid to either promote production of hydrocarbons from a production well that is in fluid connection with the injection well or to maintain reservoir pressure. As used herein "tackifying agent" refers to a non-hardening substance that has a nature such that it is (or may be activated to become) somewhat sticky to the touch. As such, the term "tackifying agent" includes, but is not limited to, aggregating agents, agglomerating agents and surface modification agents. These include compositions that are used in changing or modifying the aggregation potential and/or zeta potential of the particulates or substrate surfaces even though such zeta potential modifications may not result in a "tacky" substance. If there is any conflict in the usages of a word or term in this specification and one or more patent or other documents that may be incorporated herein by reference, the definitions that are consistent with this specification should be adopted for the purposes of understanding this invention.

In some embodiments, the methods of the present invention may reduce the likelihood of, or decrease the severity of, loss of consolidation in the reservoir penetrated by an injection well. In some embodiments, the methods of the present invention reduce the likelihood that formation solids from the injection well will be produced. For example, introducing a tackifying treatment fluid, and optionally a consolidating treatment fluid, to an injection well in accordance with the methods of the present invention may prevent the production of formation solids caused by cross-flow in the injection well bore when it is shut-in, so that formation solids do not enter the injection well bore.

Some embodiments of the present invention comprise providing an injection well and introducing a tackifying treatment fluid to the injection well, wherein the tackifying treatment fluid comprises a base fluid and a tackifying agent. Suitable tackifying agents include (1) aqueous tackifying agents, (2) non-aqueous tackifying agents, (3) gelable compositions, and (4) zeta potential altering systems. In some embodiments, the tackifying treatment fluid is a dilute dispersion, micro-emulsion, or micro-dispersion of tackifying agent in an aqueous base fluid. The tackifying treatment fluid may be introduced into the injection well at any desired rate. For example, in some circumstances is may be desirable to place the fluid at or below matrix flow rates (that is, at or below the rate at which the pressures exerted on the formation would surpass the fracture pressure) and in other circumstances, it may be desirable to place the fluid above matrix rate (that is, at a rate at which the pressure is sufficient to create or enhance fracture or channels within the formation).

In some embodiments, small droplets or particles of tackifying agent in the tackifying treatment fluid may be deposited on formation surfaces in the formation matrix and can provide a cohesive coating that helps to stabilize the formation inhibiting the movement of formation particles and sand grains and preventing fines movement. In situations where the tackifying agent is placed above matrix rates, droplets or particles of tackifying agent may form a coating on the formation particulates at the faces of the fractures even as the fractures are being formed. Suitable tackifying agents bind the formation particulates together into a loose network and discourage particle movement and migration of fines. In some preferred embodiments, it may be desirable to place the tackifying agent when it is in a relatively non-tacky state, and then to contact the agent with an activator that increases the tacky nature of the substance—such embodiments may allow for placement of the tackifying agent at desired locations within the formation before adherence. In other embodiments, the tackifying agents do not require an activator and may be added directly to the injection fluid at any time to provide formation stabilization.

According to some embodiments, the tackifying agent may be introduced to the injection well continuously, intermittently, or at only certain points in the treatment process. For example, the tackifying treatment fluid may form part of a continuous injection fluid stream during an injection operation; this embodiment may be particularly desirable in circumstances where the injection operation is performed at or above fracture rates. In other embodiments, the tackifying agent may be added to an existing injection fluid stream in intermittent stages. In any event, the tackifying agent may generally be added to the injection stream without disrupting operations at the injection well. In embodiments wherein the tackifying agent is placed at rates above the fracturing pressure of the injection well, droplets and/or particles of tackifying agent may be transported into the fracture until they are leaked off through the fracture face where they can coat the formation particles to provide stabilization, to inhibit solids movement, and to reduce fines movement. Similarly, in some embodiments, the tackifying agent may leak off into and at least partially coat fractures or channels in the formation, including those formed while the tackifying agent is being introduced into the formation.

In some embodiments, the amount of tackifying agent introduced into the injection well will depend on the amount of injection fluid to be injected. In some embodiments, the concentration of the tackifying treatment fluid that flows with the injection fluid may change over the course of the treatment, within a single stage of adding tackifying treatment fluid, or across multiple stages of adding tackifying treatment fluid. Generally, the tackifying agent may be introduced to the injection well at a concentration of about 0.01% to about 1% by volume of the injection fluid. By way of example, in some circumstances, the tackifying agent may be placed only over a small percentage of an injection operation—such as a 10 minute period injecting a tackifying agent at 0.5% by volume of the injection fluid and then no additional tackifying agent during a week of injection before again injecting a tackifying agent at 0.5% by volume of the injection fluid for 10 minutes. One skilled in the art will recognize that a higher concentration of tackifying agent might be better suited shorter term, slug-type treatments whereas a lower concentration of tackifying agent might be better suited for longer term injections.

In other embodiments, it may be desirable to taper the concentration of tackifying agent such that it is first introduced to the injection well in a higher concentration, and the concentration is continuously reduced. Alternatively, the tackifying treatment fluid may be introduced to the injection well intermittently, and each time it is introduced, the concentration of tackifying agent is successively reduced. By way of example, it might be desirable to begin a treatment at about 0.5% tackifying agent by volume of the injection fluid for less than about an hour and then have that concentration decrease to about 0.05% for a longer-term application. Tapering the concentration of the tackifying agent during the course of treatment may allow the tackifying agent to penetrate further from the well bore to enhance the formation strength along fractures and prevent fines movement along the fracture during shut-in cycles. In one example embodiment, over the course of a one-hour stage of adding tackifying treatment fluid, the concentration of tackifying agent flowing with the injection fluid may decrease from an initial concentration of about 5% by volume tackifying agent to about 0.5% by volume by the end of the treatment hour. In another example embodiment, the concentration of tackifying treatment fluid flowing with the injection fluid may decrease from an initial concentration of about 1% by volume tackifying agent to about 0.01% by volume over the course of a continuous injection period lasting several days. The selection of the amount of tackifying agent to be used depends on many factors, including the selected agent, the level of consolidation in the portion of the reservoir being treated, and the rate of placement.

In some embodiments, cycling between stages of adding tackifying treatment fluid with the injection fluid and allowing the injection fluid to flow without tackifying treatment fluid, or continuously adding the tackifying treatment fluid for a longer period of time may be beneficial because as new formation rock is exposed over time, it becomes at least partially coated and stabilized with the tackifying agent. For example, when the tackifying treatment fluid is flowing with the injection fluid, the well bore is stabilized during the injection process. If the tackifying treatment fluid flows with the injection fluid at a pressure sufficient to create or enhance a fracture in the formation or at other high rates of injection, the tackifying treatment fluid will continuously reduce or prevent erosion caused by the high rate of injection. Similarly, if the preferred fracturing direction is changed over time and fractures are created in new directions through previously unfractured rock, the newly fractured rock may become at least partially coated with tackifying agent.

Suitable base fluids that may be used in the tackifying injection fluid of the present invention may be aqueous or nonaqueous. Suitable aqueous base fluids include fresh water, salt water, brine, seawater, or any other fluid that, preferably, does not adversely react with the other components used in accordance with this invention or with the subterranean formation. Suitable nonaqueous base fluids include diesel, kerosene, short chain alcohols (methyl alcohol, ethyl alcohol, propyl alcohol, isopropyl alcohol, butyl alcohol), glycerol, ethers or any other fluid that, preferably, does not adversely react with the other components used in accordance with this invention or with the subterranean formation. One should note, however, that if long-term stability of the emulsion or dispersion of the tackifying treatment fluid is desired, in some embodiments, the preferred aqueous base fluid may be one that is substantially free of salts. It is within the ability of one skilled in the art with the benefit of this disclosure to determine if and how much salt may be tolerated in the tackifying treatment fluids of the present invention before it becomes problematic for the stability of the emulsion or dispersion. In embodiments in which the tackifying treatment fluid is an emulsion, the aqueous fluid may be present in an amount in the range of about 20% to about 99.9% by weight of the tackifying treatment fluid, alternatively, in an amount in the range of about 60% to about 99.9% by weight of the tackifying treatment fluid, or alternatively in an amount in the range of about 95% to about 99.9% by weight of the tackifying treatment fluid. Other ranges may be suitable as well, depending on the other components of the tackifying treatment fluid.

Suitable tackifying agents include aqueous tackifying agents, non-aqueous tackifying agents, gelable compositions, and zeta potential altering systems.

Aqueous Tackifying Agents

Aqueous tackifying compositions suitable for use in the present invention generally are charged polymers that comprise compounds that, when in an aqueous solvent or solution, will form a tacky, non-hardening coating (by themselves or with an activator) and, when placed on a particulate, will increase the continuous critical resuspension velocity of the particulate when contacted by a stream of water. The aqueous tackifying agent may enhance the grain-to-grain contact between the individual particulates within the formation (be they proppant particulates, formation fines, or other particulates), helping bring about the consolidation of the particulates into a stabilized mass. Examples of aqueous tackifying agents suitable for use in the present invention include, but are not limited to, acrylic acid polymers, acrylic acid ester polymers, acrylic acid derivative polymers, acrylic acid homopolymers, acrylic acid ester homopolymers (such as poly(methyl acrylate), poly (butyl acrylate), and poly(2-ethylhexyl acrylate)), acrylic acid ester co-polymers, methacrylic acid derivative polymers, methacrylic acid homopolymers, methacrylic acid ester homopolymers (such as poly (methyl methacryl ate), poly(butyl methacrylate), and poly (2-ethylhexyl methacryate)), acrylamide-methyl-propane sulfonate polymers, acrylamido-methyl-propane sulfonate derivative polymers, acrylamidomethyl-propane sulfonate co-polymers, and acrylic acid/acrylamido-methyl-propane sulfonate co-polymers, and combinations thereof. Methods of determining suitable aqueous tackifying compositions and additional disclosure on aqueous tackifying compositions can be found in U.S. Patent Application Publication No. 2005/0277554, filed Jun. 9, 2004, and U.S. Pat. No. 7,131,491 issued Nov. 7, 2006, the relevant disclosures of which are hereby incorporated by reference. Others that may be suitable include those described in U.S. Pat. No. 5,249,627, the relevant disclosure of which is incorporated herein by reference.

Surfactants may be used along with the aqueous tackifying agents in the methods of the present invention. The choice of whether to use a surfactant will be governed at least in part by the mineralogy of the formation. Generally, a surfactant may help facilitate coating of the fines by the treatment fluid. For instance, a hydrophobic polymer having a negative charge will preferentially attach to surfaces having a positive to neutral zeta potential and/or a hydrophilic surface. Therefore, in particular embodiments, a cationic surfactant may be included in a treatment fluid to facilitate application of the aqueous tackifying agent on the fines. As will be understood by those skilled in the art, amphoteric and zwitterionic surfactants also may be used so long as the conditions they are exposed to during use are such that they display the desired charge. For example, in particular embodiments, mixtures of cationic and amphoteric surfactants may be used. When used, the surfactant is present in an amount of from abut 0.1% to about 5% by weight of the aqueous tackifying treatment fluid.

Non-Aqueous Tackifying Compositions

In certain embodiments of the present invention, the consolidating agent comprises a non-aqueous tackifying composition. As used herein, the term "tackifying composition" refers to a material that exhibits a sticky or tacky character. Non-aqueous tackifying compositions suitable for use in the present invention comprise substantially any non-aqueous substance that, when in liquid form or in a solvent solution, will form a coating upon a particulate. One example of a suitable group of non-aqueous tackifying compositions comprises polyamides which are liquids or in solution at the temperature of the subterranean formation such that the polyamides are, by themselves, non-hardening when present on the particulates introduced into the subterranean formation. A particularly preferred product is a condensation reaction product comprised of commercially available polyacids and a polyamine. Such commercial products include compounds such as mixtures of C36 dibasic acids containing some trimer and higher oligomers and small amounts of monomer acids that are reacted with polyamines. Other polyacids include trimer acids, synthetic acids produced from fatty acids, maleic anhydride and acrylic acid and the like. Such acid compounds are commercially available from companies such as Witco Corporation, Union Camp, Chemtall, and Emery Industries. The reaction products are available from, for example, Champion Technologies, Inc. and Witco Corporation. Additional compounds that may be used as tackifying compounds include liquids and solutions of, for example, polyesters, polycarbonates, polycarbamates, natural resins such as shellac and the like. Suitable tackifying compounds are described in U.S. Pat. No. 5,853,048 issued to Weaver, et al. and U.S. Pat. No. 5,833,000 issued to Weaver, et al., the disclosures of which are herein incorporated by reference.

In some embodiments, it may be desirable to add a solvent to the non-aqueous tackifying compositions. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof.

Zeta Potential Altering Systems

Zeta potential as used herein is defined by the charge that develops at the interface in the boundary of hydrodynamic shear between solid surfaces as a product of the electrostatic repulsion and the attractive forces related to the Van der Waals' forces. That is, zeta potential is a function of the surface charge of the particle, any adsorbed layer at the interface, and the nature and composition of the surrounding suspension medium. Zeta potential can be affected by changes in pH, conductivity of the medium (salinity and kind of salt), and concentration of particular additives (polymer, non-ionic surfactants, etc.). Systems useful in the present invention are those that are able to alter the zeta potential of the surfaces and particulates being treated to have zeta potential values between −20 and 20 mV. A zeta potential between −20 and 20 mV corresponds to an effective charge low enough that the repulsion is lowered to a point where aggregation occurs.

The active ingredient of suitable zeta potential altering systems is an inner salt of a very low-molecular weight polymer, that when added to a treatment fluid disperses and rapidly coats any metal oxide substrate it encounters, such as proppant or subterranean formation. It also contains a penetrating alcohol, such as methanol, capable of disrupting the water layer that coats solid surfaces in the formation. The zeta potential altering system does not modify the chemical structure of friction reducers and gelling systems such as nonionic, cationic, and anionic polyacrylamide and guar gums and derivatives, making it compatible with slick-water systems and borate-based crosslinked gels. The active component is stable in acid and caustic solutions except under extreme conditions and is thermally stable to 450° F. Examples of suitable zeta-potential altering systems are described in U.S. Patent Publication No. 2009/0203553 and U.S. Pat. No. 7,350,579, the entire disclosures of which are hereby incorporated by reference.

Gelable Compositions

In some embodiments, the tackifying agents comprise a gelable composition. Gelable compositions suitable for use in the present invention include those compositions that cure to form a semi-solid, immovable, gel-like substance. The gelable composition may be any gelable liquid composition capable of converting into a gelled substance capable of substantially plugging the permeability of the formation while allowing the formation to remain flexible. As referred to in this disclosure, the term "flexible" refers to a state wherein the treated formation is relatively malleable and elastic and able to withstand substantial pressure cycling without substantial breakdown of the formation. Thus, the resultant gelled substance stabilizes the treated portion of the formation while allowing the formation to absorb the stresses created during pressure cycling. As a result, the gelled substance may aid in preventing breakdown of the formation both by stabilizing and by adding flexibility to the treated region. Examples of suitable gelable liquid compositions include, but are not limited to, (a) gelable resin compositions, (b) gelable aqueous silicate compositions, (c) crosslinkable aqueous polymer compositions, and (d) polymerizable organic monomer compositions.

Gelable Compositions—Gelable Resins

In some embodiments, the tackifying agents may comprise a gelable resin composition that cures to form a stiff gel. Suitable gelable resin compositions form flexible, resilient gelled substances. Gelable resin compositions allow the treated portion of the formation to remain flexible and to resist breakdown. Generally, the gelable resin compositions useful in accordance with this invention comprise a curable resin, a diluent, and a resin curing agent. When certain resin curing agents, such as polyamides, are used in the gelable resin compositions, the compositions form the semi-solid, immovable, gelled substances described above. Where the resin curing agent used may cause the organic resin compositions to fond hard, brittle material rather than a desired gelled substance, the curable resin compositions may further comprise one or more "flexibilizer additives" (described in more detail below) to provide flexibility to the cured compositions.

Examples of gelable resins that can be used in the present invention include, but are not limited to, organic resins such as polyepoxide resins (e.g., Bisphenol a-epichlorihydrin resins), polyester resins, urea-aldehyde resins, furan resins, urethane resins, and mixtures thereof. Of these, polyepoxide resins are preferred.

Any solvent that is compatible with the gelable resin and achieves the desired viscosity effect may be suitable for use in the present invention. Examples of solvents that may be used in the gelable resin compositions of the present invention include, but are not limited to, phenols; formaldehydes; furfuryl alcohols; furfurals; alcohols; ethers such as butyl glycidyl ether and cresyl glycidyl etherphenyl glycidyl ether; and mixtures thereof. In some embodiments of the present invention, the solvent comprises butyl lactate. Among other things, the solvent acts to provide flexibility to the cured composition. The solvent may be included in the gelable resin composition in an amount sufficient to provide the desired viscosity effect.

Generally, any resin curing agent that may be used to cure an organic resin is suitable for use in the present invention to form a gelable resin. When the resin-curing agent chosen is an amide or a polyamide, generally no flexibilizer additive will be required because such curing agents cause the gelable resin composition to convert into a semi-solid, immovable, gelled substance. Other suitable resin curing agents (such as an amine, a polyamine, methylene dianiline, and other curing agents known in the art) will tend to cure into a hard, brittle material and will thus benefit from the addition of a flexibilizer additive. Generally, the resin curing agent used is included in the gelable resin composition, whether a flexibilizer additive is included or not, in an amount in the range of from about 5% to about 75% by weight of the curable resin. In some embodiments of the present invention, the resin-curing agent used is included in the gelable resin composition in an amount in the range of from about 20% to about 75% by weight of the curable resin.

As noted above, flexibilizer additives may be used to provide flexibility to the gelled substances formed from the curable resin compositions. Flexibilizer additives may be used where the resin-curing agent chosen would cause the gelable resin composition to cure into a hard and brittle material—rather than a desired gelled substance. For example, flexibilizer additives may be used where the resin curing agent chosen is not an amide or polyamide. Examples of suitable flexibilizer additives include, but are not limited to, an organic ester, an oxygenated organic solvent, an aromatic solvent, and combinations thereof Of these, ethers, such as dibutyl phthalate, are preferred. Where used, the flexibilizer additive may be included in the gelable resin composition in an amount in the range of from about 5% to about 80% by weight of the gelable resin. In some embodiments of the present invention, the flexibilizer additive may be included in the curable resin composition in an amount in the range of from about 20% to about 45% by weight of the curable resin.

Gelable Compositions—Gelable Aqueous Silicate Compositions

In some embodiments, the tackifying agents of the present invention may comprise a gelable aqueous silicate composition. Generally, the gelable aqueous silicate compositions that are useful in accordance with the present invention generally comprise an aqueous alkali metal silicate solution and a temperature activated catalyst for gelling the aqueous alkali metal silicate solution.

The aqueous alkali metal silicate solution component of the gelable aqueous silicate compositions generally comprise an aqueous liquid and an alkali metal silicate. The aqueous liquid component of the aqueous alkali metal silicate solution generally may be fresh water, salt water (e.g., water containing one or more salts dissolved therein), brine (e.g., saturated salt water), seawater, or any other aqueous liquid that does not adversely react with the other components used in accordance with this invention or with the subterranean formation. Examples of suitable alkali metal silicates include, but are not limited to, one or more of sodium silicate, potassium silicate, lithium silicate, rubidium silicate, or cesium silicate. Of these, sodium silicate is preferred. While sodium silicate exists in many forms, the sodium silicate used in the aqueous alkali metal silicate solution preferably has a $Na_2O$-to-$SiO_2$ weight ratio in the range of from about 1:2 to about 1:4. Most preferably, the sodium silicate used has a $Na_2O$-to-$SiO_2$ weight ratio in the range of about 1:3.2. Generally, the alkali metal silicate is present in the aqueous alkali metal silicate solution component in an amount in the range of from about 0.1% to about 10% by weight of the aqueous alkali metal silicate solution component.

The temperature-activated catalyst component of the gelable aqueous silicate compositions is used to convert the gelable aqueous silicate compositions into the desired semi-solid, immovable, gelled substance described above. Selection of a temperature-activated catalyst is related, at least in part, to the temperature of the subterranean formation to which the gelable aqueous silicate composition will be introduced. The temperature-activated catalysts that can be used in the gel able aqueous silicate compositions of the present invention include, but are not limited to, ammonium sulfate (which is most suitable in the range of from about 60° F. to about 240° F.); sodium acid pyrophosphate (which is most suitable in the range of from about 60° F. to about 240° F.); citric acid (which is most suitable in the range of from about 60° F. to about 120° F.); and ethyl acetate (which is most suitable in the range of from about 60° F. to about 120° F.). Generally, the temperature-activated catalyst is present in the gelable aqueous silicate composition in the range of from about 0.1% to about 5% by weight of the gelable aqueous silicate composition.

Gelable Compositions—Crosslinkable Aqueous Polymer Compositions

In other embodiments, the tackifying agent of the present invention comprises a crosslinkable aqueous polymer composition. Generally, suitable crosslinkable aqueous polymer compositions comprise an aqueous solvent, a crosslinkable polymer, and a crosslinking agent. Such compositions are similar to those used to form gelled treatment fluids, such as fracturing fluids; however, according to the methods of the present invention, they are not exposed to breakers or de-linkers and so they retain their viscous nature over time.

The aqueous solvent may be any aqueous solvent in which the crosslinkable composition and the crosslinking agent may be dissolved, mixed, suspended, or dispersed therein to facilitate gel formation. For example, the aqueous solvent used may be fresh water, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. Preferred acrylamide-containing polymers include polyacrylamide, partially hydrolyzed polyacrylamide, copolymers of acrylamide and acrylate, and carboxylate-containing terpolymers and tetrapolymers of acrylate. Additional examples of suitable crosslinkable polymers include hydratable polymers comprising polysaccharides and derivatives thereof and that contain one or more of the monosaccharide units galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Suitable hydratable synthetic polymers and copolymers that may be used in the crosslinkable aqueous polymer compositions include, but are not limited to, polyacrylates, polymethacrylates, polyacrylamides, maleic anhydride, methylvinyl ether polymers, polyvinyl alcohols, and polyvinylpyrrolidone. The crosslinkable polymer used should be included in the crosslinkable aqueous polymer composition in an amount sufficient to form the desired gelled substance in the subterranean formation. In some embodiments of the present invention, the crosslinkable polymer is included in the crosslinkable aqueous polymer composition in an amount in the range of from about 1% to about 30% by weight of the aqueous solvent. In another embodiment of the present invention, the crosslinkable polymer is included in the crosslinkable aqueous polymer composition in an amount in the range of from about 1% to about 20% by weight of the aqueous solvent.

The crosslinkable aqueous polymer compositions suitable for use in the methods of the present invention further comprise a crosslinking agent for crosslinking the crosslinkable polymers to form the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. IN still other embodiments, a chitosan may be used as a suitable crosslinking agent as described in U.S. Pat. Nos. 6,258,755, 6,291,404, 6,607,035, 6,176,315, 6,764,981, and 6,843,841 the relevant disclosures of which are hereby incorporated by reference.

The crosslinking agent should be present in the crosslinkable aqueous polymer compositions in an amount sufficient to provide, inter alia, the desired degree of crosslinking. In some embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, inter alia, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

Gelable Compositions—Polymerizable Organic Monomer Compositions

In other embodiments, the gelled liquid compositions suitable for use in the methods of the present invention comprise polymerizable organic monomer compositions. Generally, suitable polymerizable organic monomer compositions comprise an aqueous-base fluid, a water-soluble polymerizable organic monomer, an oxygen scavenger, and a primary initiator.

The aqueous-based fluid component of the polymerizable organic monomer composition generally may be fresh water, salt water, brine, seawater, or any other aqueous liquid that does not adversely react with the other components used in accordance with this invention or with the subterranean formation.

A variety of monomers are suitable for use as the water-soluble polymerizable organic monomers in the present invention. Examples of suitable monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacryl ate chloride, N,N-dimethylaminopropylmethacryl-amide, methacrylamidepropyltriethylammonium chloride, N-vinyl pyrrolidone, vinyl-phosphonic acid, and methacryloyloxyethyl trimethylammonium sulfate, and mixtures thereof. Preferably, the water-soluble polymerizable organic monomer should be self-crosslinking. Examples of suitable monomers which are self crosslinking include, but are not limited to, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, polypropylene glycol methacrylate, and mixtures thereof. Of these, hydroxyethylacrylate is preferred. An example of a particularly preferable monomer is hydroxyethylcellulose-vinyl phosphoric acid.

The water-soluble polymerizable organic monomer (or monomers where a mixture thereof is used) should be included in the polymerizable organic monomer composition in an amount sufficient to form the desired gelled substance after placement of the polymerizable organic monomer composition into the subterranean formation. In some embodiments of the present invention, the water-soluble polymerizable organic monomer is included in the polymerizable organic monomer composition in an amount in the range of from about 1% to about 30% by weight of the aqueous-base fluid. In another embodiment of the present invention, the water-soluble polymerizable organic monomer is included in the polymerizable organic monomer composition in an amount in the range of from about 1% to about 20% by weight of the aqueous-base fluid.

The presence of oxygen in the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be pre-dissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

The primary initiator is used to initiate polymerization of the water-soluble polymerizable organic monomer(s) used in the present invention. Any compound or compounds that form free radicals in aqueous solution may be used as the primary initiator. The free radicals act, inter alia, to initiate polymerization of the water-soluble polymerizable organic monomer present in the polymerizable organic monomer composition. Compounds suitable for use as the primary initiator include, but are not limited to, alkali metal persulfates; peroxides; oxidation-reduction systems employing reducing agents, such as sulfites in combination with oxidizers; and azo polymerization initiators. Preferred azo polymerization initiators include 2,2'-azobis(2-imidazole-2-hydroxyethyl)propane, 2,2'-azobis(2-aminopropane), 4,4'-azobis(4-cyanovaleric acid), and 2,2'-azobis(2-methyl-N-(2-hydroxyethyl) propionamide. Generally, the primary initiator should be present in the polymerizable organic monomer composition in an amount sufficient to initiate polymerization of the water-soluble polymerizable organic monomer(s). In certain embodiments of the present invention, the primary initiator is present in the polymerizable organic monomer composition in an amount in the range of from about 0.1% to about 5% by weight of the water-soluble polymerizable organic monomer(s). One skilled in the art will recognize that as the polymerization temperature increases, the required level of activator decreases.

Optionally, the polymerizable organic monomer compositions further may comprise a secondary initiator. A secondary initiator may be used, for example, where the immature aqueous gel is placed into a subterranean formation that is relatively cool as compared to the surface mixing, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s).

Also optionally, the polymerizable organic monomer compositions suitable for use in the methods of the present invention further may comprise a crosslinking agent for crosslinking the polymerizable organic monomer compositions in the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition.

Resins

In addition to tackifying agents, in some embodiments of the present invention, a resin treatment fluid may be introduced to an injection well prior to the time that a tackifying treatment fluid is introduced. Placement of a resin before the tackifying agent may help to develop high strength in the near well bore area before subsequent introduction of an injection fluid at a high rate and pressure. In general, a resin treatment fluid that is used in accordance with the methods of the present invention comprises a resin material dispersed in an aqueous base fluid such as a brine. In cases in which a consolidating treatment fluid precedes the tackifying treatment fluid, the resin material is preferably allowed to at least partially cure in the formation before the tackifying treatment fluid is introduced. Curing of the consolidating material in at least a portion of the formation surrounding the injection well may consolidate and stabilize that area into a permeable, consolidated mass. In exemplary embodiments, the resin is present in the resin treatment fluid in a low concentration so as to minimize formation damage while still providing relatively high strength to the formation when cured. One skilled in the art will recognize that higher concentrations of resin may be used to provide additional strength to the formation; however, subsequent regained permeability of the formation may be sacrificed. Similarly, one skilled it the art the strength conferred by the consolidating treatment fluid may depend on how far the consolidating treatment fluid is over-displaced in the formation. Minimum over-displacement may tend to yield a higher-strength consolidated formation while a consolidating treatment fluid that is over displaced more completely into the formation will yield lower strength in the near well bore area.

The term "resin" as used herein refers to any of numerous physically similar polymerized synthetics or chemically modified natural resins including thermoplastic materials and thermosetting materials. Resins suitable for use in the present invention include two-component epoxy resins, furan-based resins, phenolic-based resins, and phenol/phenol formaldehyde/furfuryl alcohol resins. U.S. Patent Application number 2009-0120639 filed Nov. 14, 2007 and published May 14, 2009, the relevant disclosure of which is hereby incorporated by reference, describes these resins and their use in consolidating formation particulates.

In some embodiments in which a resin is used in a resin treatment fluid, the resin may be present in the resin treatment fluid in an amount in the range of about 0.5% to about 50% by volume of treatment fluid, preferably from about 1% to about 20% by volume. In other embodiments, the amount of resin used is based on the interval being treated. For example, the resin may be introduced to an injection well so that a total of about 0.5 gallons to about 100 gallons of consolidating material per foot of interval is introduced.

Sand Control Devices

The sand control devices are essentially filter assemblies used to retain either formation solids or particulates such as gravel that are placed into the subterranean formation. Suitable sand control devices that may be used in the present invention include sand control screens, liners, and combinations thereof. A sand control liner is generally a well bore tubular in which slots (slotted liner) or holes (perforated liner) have been made before the tubular is placed into the well bore. A sand control screen is generally a more flexible filter assembly that may be used in conjunction with a liner or alone. As will be understood by one of ordinary skill in the art, a wide range of sizes and screen configurations are available to suit the characteristics (such as size, spherocity, etc.) of the formation solids or particulates that are meant to be controlled by the device. The sand control device, with or without added gravel, presents a barrier to migrating sand from the formation while still permitting fluid flow.

Any sand control screen or perforated liner known in the art and suitable for the injection well being treated may be used in the embodiments of the present invention. One known type of sand control screen commonly used in open hole completions where gravel packing may not be feasible, is expandable sand control screens. Typically, expandable sand control screens are designed to not only filter particulate materials out of the formation fluids, but also provide radial support to the formation to prevent the formation from collapsing into the well bore. Another open hole completion screen type known in the art is a stand alone screen. Typically, stand alone screens may be used when the formation generally comprises a more uniform particle size distribution. Still another known type of sand control screen is a telescoping screen whereby hydraulic pressure is used to extend the telescoping screen radially outwardly toward the well bore. This process requires providing fluid pressure through the entire work string that acts on the telescoping members to shift the members from a partially extended position to a radially extended position. Another type of suitable sand control screen is described in United States Patent Publication No. 2009/0173497, the entire disclosure of which is hereby incorporated by reference, and includes a base pipe having at least one opening in a sidewall portion thereof; a swellable material layer disposed exteriorly of the base pipe and having at least one opening corresponding to the at least one opening of the base pipe; a telescoping perforation operably associated with the at least one opening of the base pipe and at least partially disposed within the at least one opening of the swellable material layer; and a filter medium disposed within the telescoping perforation. Another suitable sand control device is described in U.S Patent Publication No. 2009/0173490, which describes a swellable packer activated screen approach that may provide stand off from the formation to allow filter-cake clean up To facilitate a better understanding of the present invention, the following examples of certain aspects of some embodiments are given. In no way should the following examples be read to limit, or define, the entire scope of the invention.

EXAMPLES

Example 1

To provide a control experiment, a test cell was filled with different layers of material. From top to bottom, the test cell contained a top plunger, a 40-mesh screen, a layer of 16/20-mesh Carbolite proppant, a mixture of smaller than 200-mesh Brazos River sand and 20/40-mesh Brady sand, a layer of 40/60-mesh sand, an 80-mesh screen, and a bottom plunger. Using a peristaltic pump, 100 cm$^3$ of 3% KCl brine was injected from the top of the test cell at 8 cm$^3$ per minute in order to saturate the sand pack. Then, 3% KCl was flowed through the test cell in the reverse direction (from the bottom of the test cell up through the sand pack) at incremental flow rates of 50, 100, 150, 200 and 300 cm3 per minute. Each flow rate was continued until about 100 cm$^3$ of effluent was able to be collected in a separate glass bottle. The collected effluents were visibly cloudy with particulates.

Example 2

A dry test cell was prepared as described in Example 1. Using a peristaltic pump, 100 cm3 of 3% KCl brine was injected from the top of the test cell at 8 cm$^3$ per minute in order to saturate the sand pack. Then 100 cm3 of a dilute solution of water-based tackifying emulsion was flowed through the test cell at 8 cm$^3$ per minute. The dilute solution of water based tackifying emulsion was prepared by diluting 5 cm$^3$ of 20% v/v of 5 cm$^3$ of an aqueous tackifier in 20 cm$^3$ of tap water with 95 cm$^3$ of KCl brine. The dilute solution of water-based tackifying emulsion was followed by a post flush of 150 cm$^3$ of KCl brine. Immediately thereafter (no shut-in period), 3% KCl was flowed through the test cell in the reverse direction (from the bottom of the test cell up through the sand pack) at incremental flow rates of 50, 100, 150, 200 and 300 cm3 per minute. Each flow rate was continued until about 100 cm$^3$ of effluent was able to be collected in a separate glass bottle. The effluents collected in this example were visibly clearer (contained fewer particulates) than the effluents collected in Example 1.

Example 3

A dry test cell was prepared as described in the preceding examples. Using a peristaltic pump, 100 cm$^3$ of 3% KCl brine was injected from the top of the test cell at 8 cm3 per minute in order to saturate the sand pack. Then 100 cm3 of a low-concentration, water based epoxy resin emulsion was flowed through the test cell at 8 cm$^3$ per minute. The low concentration, water-based epoxy resin emulsion was prepared by diluting 10 cm$^3$ of a disperse water-borne two-part epoxy resin system 5 cm$^3$ of a water-based epoxy resin emulsion and 5 cm$^3$ of water-based epoxy resin emulsion with 90 cm$^3$ of 3% KCl brine. The test cell was shut in at 150° F. for 20 hours. Then 3% KCl was flowed through the test cell in the reverse direction (from the bottom of the test cell up through the sand pack) at incremental flow rates of 50, 100, 150, 200 and 300 cm$^3$ per minute. Each flow rate was continued until about 100 cm$^3$ of effluent was able to be collected in a separate glass bottle. The effluents collected in this example were more visibly clearer (contained fewer particulates) than the effluents collected in Example 1.

Example 4

In a dry test cell, about 180 grams of 70/170-mesh sand was packed in a test cell. This sand pack was placed between 0.5-inch layers of 40/60-mesh sand. Wire-mesh screens were placed at the bottom and top of the 40/60-mesh sand layers to hold the sand pack in place. Cold tab water was connected to the test cell and allowed to flow through the sand pack for 4 hours at 15 to 30 cm$^3$ per minute. After this initial flowing period, the flow of tap water was temporarily suspended. A volume of 100 cm$^3$ of water containing 0.5 cm$^3$ of a cationic surfactant was injected into the sand pack at 25 cm3 per minute. After this injection, a volume of 50 cm$^3$ of water-borne two-part epoxy resin system containing 0.5 cm$^3$ of a water-based epoxy resin emulsion and 0.5 cm$^3$ of water dispersible curing agent an was injected into the sand pack at 25 cm$^3$ per minute. The flow of tap water was then re-established at 15 to 30 cm$^3$ per minute until the next day. This process was repeated for 6 days. The sand pack and test cell were remained at room temperature. On the seventh day, the sand pack was removed from the test cell. The sand pack was consolidated. The consolidated core was cut into smaller segments for Brazilian tensile strength measurements. The tensile strengths of top, middle, and bottom segments were 19 psi, 32 psi, and 41 psi, respectively.

Example 5

In a dry test cell, about 180 grams of 70/170-mesh sand was packed in a test cell. This sand pack was placed between 0.5-inch layers of 40/60-mesh sand. Wire-mesh screens were placed at the bottom and top of the 40/60-mesh sand layers to hold the sand pack in place. Cold tab water was connected to the test cell and allowed to flow through the sand pack for 4 hours at 15 to 30 cm$^3$ per minute. After this initial flowing period, the flow of tap water was temporarily suspended. A volume of 100 cm$^3$ of water containing 0.5 cm$^3$ of a cationic surfactant was injected into the sand pack at 25 cm$^3$ per minute. After this injection, a volume of 50 cm$^3$ mixture containing 25 cm$^3$ of water-borne epoxy resin and 25 cm$^3$ of 20% v/v of 5 cm$^3$ of an aqueous tackifier in 20 cm$^3$ of tap water was injected into the sand pack at 25 cm$^3$ per minute. The flow of tap water was then re-established at 15 to 30 cm$^3$ per minute until the next day. This process was repeated for 6 days. The sand pack and test cell were remained at room temperature. On the seventh day, the sand pack was removed from the test cell. The sand pack was consolidated. The consolidated core was cut into smaller segments for Brazilian tensile strength measurements. The tensile strengths of top, middle, and bottom segments were 6 psi, 6 psi, and 6 psi, respectively.

Example 6

In a dry test cell, about 180 grams of 70/170-mesh sand was packed in a test cell. This sand pack was placed between 0.5-inch layers of 40/60-mesh sand. Wire-mesh screens were placed at the bottom and top of the 40/60-mesh sand layers to hold the sand pack in place. Cold tab water was connected to the test cell and allowed to flow through the sand pack for 4 hours at 15 to 30 cm$^3$ per minute. After this initial flowing period, the flow of tap water is temporarily suspended. A volume of 100 cm$^3$ of water containing 0.5 cm$^3$ of a cationic surfactant was injected into the sand pack at 25 cm$^3$ per minute. After this injection, a volume of 50 cm$^3$ of an aqueous mixture containing 10 cm3 of furfuryl alcohol monomer was injected into the sand pack at 25 cm$^3$ per minute. After this injection, a post-flush volume of 50 cm3 of 10% HCl solution was injected into the sand pack at 25 cm3 per minute. The flow of tap water was then re-established at 15 to 30 cm$^3$ per minute until the next day. This process was repeated for 6 days. The sand pack and test cell were remained at room temperature. On the seventh day, the sand pack was removed from the test cell. The sand pack was consolidated. The consolidated core was cut into smaller segments for Brazilian tensile strength measurements. The tensile strengths of top, middle, and bottom segments were 14 psi, 21 psi, and 1 psi, respectively.

The results obtained Examples 4-6 indicated the injection of aggregating or consolidating agents as part of the water injection provides cohesion or consolidation for the unconsolidated formation sand in the water-injection wells to prevent formation sand producing back.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   providing an injection well into which fluids are injected and from which hydrocarbons are not produced;
   introducing a tackifying treatment fluid through the injection well and into a portion of a subterranean formation surrounding the injection well, wherein the tackifying treatment fluid comprises a base fluid and a tackifying agent and wherein the tackifying agent is included in the tackifying treatment fluid at a concentration of about 0.01% to about 1% by volume of the treatment fluid; wherein the tackifying agent is introduced into the portion of a subterranean formation through the injection well in a tapered concentration such that it is first introduced in a higher concentration and the concentration is continuously reduced.

2. The method of claim 1 wherein the tackifying treatment fluid is introduced into the portion of the subterranean formation at or below the matrix flow rate.

3. The method of claim 1 wherein the tackifying treatment fluid is introduced into the portion of the subterranean formation above the matrix flow rate.

4. The method of claim 1 wherein the base fluid is selected from the group consisting of an aqueous fluid and a nonaqueous fluid.

5. The method of claim 1 wherein the tackifying agent is incorporated into the base fluid in the form of small droplets or particles.

6. The method of claim 1 wherein the tackifying agent is selected from the group consisting of an aqueous tackifying agent, a non-aqueous tackifying agent, a gelable composition, and a zeta potential altering system.

7. The method of claim 6 wherein the gelable composition is selected from the group consisting of gelable resin compositions, gelable aqueous silicate compositions, crosslinkable aqueous polymer compositions, polymerizable organic monomer compositions, and any combination thereof.

8. A method comprising:
   providing an injection well into which fluids are injected and from which hydrocarbons are not produced;
   introducing a resin treatment fluid through the injection well into a portion of a subterranean formation surrounding the injection well wherein the resin treatment fluid comprises a first base fluid and a resin;
   allowing the resin to at least partially cure within the formation; and,
   introducing a tackifying treatment fluid to the injection well, wherein the tackifying treatment fluid comprises a second base fluid and a tackifying agent; wherein the tackifying agent is introduced into the injection well through the injection well in a tapered concentration such that it is first introduced in a higher concentration and the concentration is continuously reduced.

9. The method of claim 8 further comprising the step of:
   installing a sand control device in the injection well between the step of allowing the resin to cure and the step of introducing a tackifying treatment fluid.

10. The method of claim 8 further comprising the step of:
    installing a sand control device in the injection well before the step of introducing a resin treatment fluid.

11. The method of claim 10 wherein a gravel pack is placed between the injection well wellbore and the sand control device.

12. The method of claim 8 wherein the tackifying treatment fluid is introduced into the portion of the subterranean formation at or below the matrix flow rate.

13. The method of claim 8 wherein the tackifying treatment fluid is introduced into the portion of the subterranean formation above the matrix flow rate.

14. The method of claim 8 wherein the first base fluid is selected from the group consisting of an aqueous fluid and a nonaqueous fluid.

15. The method of claim 8 wherein the tackifying agent is included in the tackifying treatment fluid at a concentration of about 0.01% to about 1% by volume of the treatment fluid.

16. The method of claim 8 wherein the tackifying agent is incorporated into the second base fluid in the form of small droplets or particles.

17. The method of claim 8 wherein the tackifying agent is selected from the group consisting of an aqueous tackifying agent, a non-aqueous tackifying agent, a gelable composition, and a zeta potential altering system.

18. The method of claim 17 wherein the gelable composition is selected from the group consisting of gelable resin compositions, gelable aqueous silicate compositions, crosslinkable aqueous polymer compositions, polymerizable organic monomer compositions, and any combination thereof.

19. The method of claim 8 wherein the resin is selected from the group consisting of two-component epoxy resins, furan-based resins, phenolic-based resins, and phenol/phenol formaldehyde/furfuryl alcohol resins, and any combination thereof.

20. The method of claim 8 wherein the resin is included in the resin treatment fluid at a concentration of about 0.5% to about 50% by volume of the resin treatment fluid.

* * * * *